(12) United States Patent
Chatterjee et al.

(10) Patent No.: US 10,135,252 B2
(45) Date of Patent: Nov. 20, 2018

(54) INTRA-MODULE DC-DC CONVERTER AND A PV-MODULE COMPRISING SAME

(71) Applicant: KATHOLIEKE UNIVERSITEIT LEUVEN, Leuven (BE)

(72) Inventors: Urmimala Chatterjee, Heverlee (BE); Johan Driesen, Heverlee (BE)

(73) Assignee: Katholieke Universiteit Leuven, Leuven (BE)

( * ) Notice: Subject to any disclaimer, the term of this patent is extended or adjusted under 35 U.S.C. 154(b) by 236 days.

(21) Appl. No.: 15/024,456

(22) PCT Filed: Sep. 24, 2014

(86) PCT No.: PCT/EP2014/070354
§ 371 (c)(1),
(2) Date: Mar. 24, 2016

(87) PCT Pub. No.: WO2015/044192
PCT Pub. Date: Apr. 2, 2015

(65) Prior Publication Data
US 2016/0268806 A1    Sep. 15, 2016

(30) Foreign Application Priority Data
Sep. 24, 2013  (GB) .................................. 1316903.2

(51) Int. Cl.
*H02J 3/38*    (2006.01)
*H02M 3/158*    (2006.01)
(Continued)

(52) U.S. Cl.
CPC ............... *H02J 3/383* (2013.01); *H02M 3/04* (2013.01); *H02M 3/1584* (2013.01); *H02M 7/44* (2013.01);
(Continued)

(58) Field of Classification Search
CPC ...................................................... H02J 3/282
(Continued)

(56) References Cited

U.S. PATENT DOCUMENTS

| 4,199,805 A | 4/1980 | Martinelli et al. |
| 6,100,665 A | 8/2000 | Alderman |
| 9,639,106 B2 * | 5/2017 | Gazit ........................ G05F 3/08 |

FOREIGN PATENT DOCUMENTS

| CN | 103066841 A | 4/2013 |
| CN | 203119763 U | 8/2013 |

(Continued)

OTHER PUBLICATIONS

Great Britain Search Report for corresponding Great Britain Application 1316903.2, dated Feb. 19, 2014.
(Continued)

*Primary Examiner* — Joseph Chang
(74) *Attorney, Agent, or Firm* — Workman Nydegger (57) ABSTRACT

The present invention relates to an intra-module DC-DC power converter and a Photovoltaic (PV) module comprising same. The switching frequency of said intra-module DC-DC power converters may be 500 kHz. The PV module may have a controller and a plurality of switches for allowing each individual string of said PV module to be connected to one corresponding DC-DC converter, or for allowing two or more strings of said module to be connected in series and to apply the voltage of the combined string to a single DC-DC converter. The input voltage range of the DC-DC converters may be 10V to 30V, and the output voltage range may be 120V. The DC-DC converters may be connected in series or in parallel. Multiple such PV panels may be connected in a DC-grid.

17 Claims, 8 Drawing Sheets

(51) Int. Cl.
  *H02M 3/04* (2006.01)
  *H02M 7/44* (2006.01)
(52) U.S. Cl.
  CPC .... *H02M 2003/1586* (2013.01); *Y02E 10/563* (2013.01)
(58) Field of Classification Search
  USPC .......................................................... 307/82
  See application file for complete search history.

(56) References Cited

FOREIGN PATENT DOCUMENTS

| EP | 1342308 A2 | 9/2003 |
|---|---|---|
| GB | 870652 A | 6/1961 |

OTHER PUBLICATIONS

International Search Report for corresponding International PCT Application PCT/EP2014/070354, dated Mar. 20, 2015.
Prudente et al., "Voltage Multiplier Cells Applied to Non-Isolated DC-DC Converters," IEEE Transactions on Power Electronics, Mar. 2008, pp. 871-887, vol. 23, No. 2.
Shimizu et al., "Generation Control Circuit for Photovoltaic Modules," IEEE Transactions on Power Electronics, May 2001, pp. 293-300, vol. 15, No. 3.
Tofoli et al., "Novel Nonisolated High-Voltage Gain DC-DC Converters Based on 3SSC and VMC," IEEE Transactions on Power Electronics, Sep. 2012, pp. 3897-3907, vol. 27, No. 9.
Vekhande et al., "Central Multilevel Current-fed Inverter with Module Integrated DC-DC Converters for Grid-connected PV Plant," 2013 IEEE Energy Conversion Congress and Exposition, 2013, pp. 1933-1940.
Zhang et al., "Hybrid Boost Three-Level DC-DC Converter with High Voltage Gain for Photovoltaic Generation Systems," IEEE Transactions on Power Electronics, Aug. 2013, pp. 3659-3664, vol. 28, No. 8.
Gules et al., "An Interleaved Boost Dc-Dc Converter with Large Conversion Ratio", UNISINOS-Universidade do Vale do Rio dos Sinos, IEEE, 2003, pp. 411-416.
Myrzik et al., "String and Module Integrated Inverters for Single-Phase Grid Connected Photovoltaic Systems—A Review", IEEE Bologna PowerTech Conference, Jun. 2003, 8 Pages.
Olalla et al., "Architecture and Control of PV Modules with Submodule Integrated Converters", Colorado Power Electronics Center, IEEE, 2012, 6 Pages.
European Search Report from EP Application No. 14772155.9, dated Feb. 2, 2017.

* cited by examiner

FIG 1

"PRIOR ART"

INTRA-MODULE DC-DC CONVERTER AND A PV-MODULE COMPRISING SAME

TECHNICAL FIELD

The present invention relates to an intra-module DC-DC converter, and to a PV-module comprising same.

TECHNICAL BACKGROUND

Photovoltaic (PV) panels, herein also referred to as PV units or PV modules, have long been argued to be a very attractive solution for future clean energy resource. The efficiency of a photovoltaic system is varied in different operating conditions by time-dependent effects. The efficiency of today's solar panel is about 18% to 23%, however the effective efficiency of a PV system is strongly affected by varying factors such as partial shading. In rooftop applications, these problems become more eminent. In reality, variations in output powers exist between different solar cells of a PV module because of the partial shading in the module. These variations in PV cells lead to a relatively significant power loss, which apparently affect the overall efficiency. The usage of a centralized power converter for a system with a large number of modules, makes this power mismatching a crucial factor.

In state of the art research literature, only limited studies are available on the distributed power management techniques at the PV module and submodule level. Due to the power mismatch which occurs between different solar cells there is a significant power loss at the output.

Therefore, a need exists for improved methods and devices for distributed power management techniques specially at the PV submodule level.

SUMMARY OF THE INVENTION

A need still exists for improved methods and devices for distributed power management techniques at the PV module level. More specifically a need still exists for improved methods and devices for improved distributed power management techniques at the PV module level and especially at the string level inside a PV module, meaning at PV submodule level.

It is an object of the present invention to provide a good circuit and a good method for electrical power generation.

It is an object of particular embodiments of the present invention to provide a PV module and a PV system with an improved power efficiency under different lighting conditions, such as e.g. partial shading of some PV modules but not others, and/or partial shading of some cells of a given module but not others.

It is an object of particular embodiments of the present invention to provide a PV module suitable for use in a DC power grid, for example an in-house DC power grid.

It is an object of particular embodiments of the present invention to provide an alternative device and method for improving the distributed power management at the string level inside the PV module.

In the present invention, the term "photovoltaic unit" or "PV unit" refers to a string comprising a plurality of solar cells inside a PV-module. The number of cells in a string inside a PV module can be chosen and distributed, based on requirement and on the know-how of the skilled person.

In embodiments of the present invention the term "intra-module" may mean a module at the string level inside a solar photovoltaic (PV) module.

In a first aspect the present invention provides circuits for obtaining power from a photovoltaic unit, the circuit comprising an intra-module DC-DC power converter, whereby said intra-module DC-DC power converter comprises:

at least one multiplier stage (M), said multiplier stage comprising two capacitors (CM1, CM2), each capacitor respectively connected to a diode (DM1, DM2), and whereby said diodes ($D_{M1}$, $D_{M2}$) of the at least one multiplier cell are adapted to charge the multiplier capacitors ($C_{M1}$, $C_{M2}$) with a charge voltage ($V_M$), and whereby the input signal ($V_{in}$) from the photovoltaic unit is converted into an output signal ($V_{out}$), whereby said output signal is (M+1) times the charge voltage ($V_M$). Although such a DC-DC converter circuit is known per se in the prior art, the use of such a circuit as an intra-module DC-DC converter is (as far is known to the inventors) not known in the prior art. Moreover, the addition of a DC-DC converter inside a PV-module is not obvious, because a PV panel already provides a DC voltage.

It is an advantage of a PV module with at least two intra-module DC-DC converters, that it can offer an improved power output under various lighting conditions. In particular, such a PV module can provide an improved power output under partial shading conditions.

The PV module may have a plurality of strings, e.g. two or three strings, each string comprising a plurality of solar cells and one DC-DC converter connected in series, and whereby all the DC-DC converters of said PV module are adapted for generating a same output voltage, e.g. 120V, so that the outputs of all the DC-DC converters can be connected in parallel. It is also possible to connect the outputs of multiple such PV modules, all being adapted for generating the same output voltage, to a so called "DC-grid". The output voltage may be chosen to be any value in the range of 120V to 240V DC, e.g. 120V DC.

In preferred embodiments the two capacitors ($C_{M1}$, $C_{M2}$), are respectively connected in series by one diode ($D_{M1}$, $D_{M2}$) and both the capacitors and diodes are connected in parallel with an output capacitor ($C_0$). Preferably each capacitor ($C_{M1}$, $C_{M2}$) is connected in series to at least one switch, resulting in two switches ($S_1$, $S_2$) and whereby preferably said switches are connected in parallel.

In preferred embodiments the switching frequency of said switches is a frequency in the range of 400 to 500 KHz. This offers the advantage that the passive components of the circuit can be reduced in size, which allows the circuit to be mounted inside a PV module. Moreoever components with a reduced size typically also have a reduced component cost.

Preferably the switching frequency is fixed, e.g. has a predefined value of 400 kHz or 500 kHz.

In preferred embodiments the circuit, according to embodiments of the present invention, may further comprise two inductors ($L_1$, $L_2$).

In preferred embodiments the intra-module DC-DC power converter, according to embodiments of the invention, is a non-isolated power converter.

In preferred embodiments the intra-module DC-DC power converter according to embodiments of the invention is a boost power converter.

In preferred embodiments the input signal of the intra-module DC-DC power converter is an input voltage ($V_{in}$) that ranges from at least 10 to 30 V when in operation.

In preferred embodiments the input signal of the intra-module DC-DC power converter is an input current of at most 8 A when in operation.

In preferred embodiments the output signal of the intra-module DC-DC power converter is an output voltage ($V_{out}$) of 120V fixed when in operation.

In preferred embodiments the maximal voltage gain of the intra-module DC-DC power-converter, according to embodiments of the invention whereby said intra-module DC-DC power converter comprises two multiplier stages (M=2), is 12.

In a second aspect the present invention provides a system for controlling a plurality of photovoltaic units, the system comprising:

a first circuit comprising a first intra-module DC-DC power converter according to the first aspect of the present invention, connected or coupled to a first photovoltaic unit;

a second circuit comprising a second intra-module DC-DC power converter according to the first aspect of the present invention, connected or coupled in series or parallel with the first intra-module DC-DC power converter and connected or coupled to a second photovoltaic unit;

a controller that is adapted to control a voltage of the first and second intra-module DC-DC power converters.

Instead of a single controller for controlling the duty cycles of multiple DC-DC converters, each DC-DC converter may have an individual controller for controlling its duty cycle. Another MPPT controller may be used at higher level, e.g. at PV module level.

In preferred embodiments the system according to embodiments of the present invention may further comprise a third intra-module DC-DC power converter, whereby said third intra-module DC-DC power converter is coupled or connected in series or parallel to said first and/or second DC-DC power converter.

In preferred embodiments the system according to embodiments of the invention, may further comprise converting means to connect or couple an output of said DC-DC power converters to the public grid through the next stage of power conversion.

In a third aspect the present invention provides a use of a circuit according to embodiments of the invention as an intra-module DC-DC power converter for obtaining power from a photovoltaic unit. In another aspect the present invention provides a use of a circuit according to embodiments of the invention as a distributed DC-DC converter at string level of the PV module. In a further aspect the present invention provides a use of a circuit according to embodiments of the invention to enable a distributed power management system.

In an aspect the present invention provides the use of a boost converter as an intra-module DC-DC power converter for obtaining power from a photovoltaic unit.

In another aspect the present invention provides the use of a boost converter at string level of the PV module to enable a distributed power management system.

In a fourth aspect, the present invention provides a photovoltaic module comprising a circuit according to the first aspect, or a system according to the second aspect, wherein the switching frequency lies in the range of 400 to 500 kHz, and the output voltage is 120V.

In an embodiment, the photovoltaic module may further comprise a plurality of strings, each string being connectable to at least one corresponding DC-DC power converter, whereby the DC-DC power converters of all the strings are connected in parallel, and are adapted for generating a same output voltage. Each string may comprise e.g. at least eighteen solar cells connected in series in order to obtain a minimum input voltage of 10V during operation.

In an embodiment, the photovoltaic module may further comprise a plurality of strings, each string being connectable to at least one corresponding DC-DC power converter, whereby the DC-DC power converters of all the strings are connected in series.

In each of these embodiments, the photovoltaic module may further comprise a plurality of switches for allowing the strings to be connected in series, and to allow the series connection to be connected to one of said DC DC power converters.

In a fifth aspect, the present invention provides a DC power grid comprising at least two photovoltaic modules according to the fourth aspect, connected in parallel.

Embodiments of the present invention provide a distributed power management system which is a key factor to improve the efficiency of the PV system under non-uniform lighting conditions. In order to minimize the power mismatches between different strings of solar cells, local converters according to embodiments of the invention are preferably integrated between strings.

Embodiments of the present invention provide a non-isolated high gain boost converter circuit or topology, whereby said circuit is adapted to be implemented as an intra-module DC-DC converter.

An intra-module converter according to embodiments of the invention is beneficial in terms of overall efficiency improvement of the PV system. It is also seen that circuits and topologies according to embodiments of the invention are suitable to operate at high frequency (e.g. 500 kHz), to operate in wide input voltage range (e.g. 10V to 30V) and useful to achieve high voltage gain (e.g. factor of 12) of a converter. Because the circuit according to embodiments of the invention can operate at a wide input voltage range, advantageously the circuit is enabled to be used and integrated at the string level inside the PV module, so as to provide a PV module with an integrated DC-DC converter. It is advantageously also possible to attain significant low input ripple current due to implemented interleaved technique and for the very high switching frequency operation. Therefore, the designed converter according to embodiments of the invention is appropriate to be used as a distributed DC-DC converter at string level of the PV module.

Embodiments of the present invention in addition provide a control system which can be designed to control the duty ratio of the converter, for example to make sure that the output voltage of each DC-DC power converter is the same voltage.

Embodiments of the invention provide requirements for an intra-module converter in photovoltaic system and also provides that different factors are preferably considered while implementing a DC-DC converter as an intra-module converter according to embodiments of the invention. Embodiments of the invention in addition provide a circuit of high gain DC-DC converter, which can be used as an intra-module converter, so that a minimum number of power conversion stages is needed before interface with a DC-AC inverter. Advantageously a converter according to embodiments of the invention is suitable to be used in various photovoltaic applications.

Embodiments of the invention advantageously provide solutions for partial shading on output power of a photovoltaic system and overcomes the limitations of a centralized power conversion for extenuation.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

Further features of the present invention will become apparent from the examples and figures, wherein.

The drawings are only schematic and are non-limiting. In the drawings, the size of some of the elements may be exaggerated and not drawn on scale for illustrative purposes.

DETAILED DESCRIPTION OF PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

By way of illustration, embodiments of the present invention not being limited thereto, different embodiments of the present invention will now be discussed in somewhat more detail.

There have been limited approaches on the distributed power management proficiency. In state of the art research, most of the photovoltaic systems include multiple modules, in series or in parallel, connected with a central DC-AC inverter through a central DC-DC converter. Central inverters are mostly used for large scale PV applications where shading or different orientation of modules is prevented from the planning stage and the impact of them is negligible. However, the central power converters used in the art are not able to deal with the problems of power mismatch between the cells as well as between the modules. In case of central inverter for instance, the Maximum Power Point (MPP) tracking is done centrally and the mismatch losses of the strings of the modules result to high energy losses of the system. In order to mitigate this mismatch problem, some of the literature focuses on the module level DC-DC conversion as a possible solution that decreases the impact of mismatches by performing MPP tracking at module level. In a previous attempt, the benefits of module level converter have been identified and discussed in detail about the module level DC-DC conversion. For instance a concept of 'delta conversion' for module level converters has been proposed to average out differences in output power between groups of PV cells within modules and between modules inside the PV system. In other disclosures, also asymmetrical boost converter circuits have been presented for PV application. To achieve a high gain more inductive elements have been used in these circuits known in the art, which is a constrain to build a compact converter and accordingly for an intra-module PV converter. Some of the approaches in the literature deal with mismatch problems within the module and can be used at sub-module level power conversion.

Advantageously, embodiments of the present invention provide solutions for the effect of partial shading on an overall PV system efficiency, and moreover a novel distributed power conversion system is provided. The benefits of distributed power conversion, according to embodiments of the invention, over a centralized power conversion in photovoltaic system as known in the art are numerous. To enable said distribute power conversion, embodiments of the invention provide a non-isolated high gain DC-DC boost converter. In addition, the converter according to embodiments of the invention is advantageously suitable as a low power high frequency intra-module DC-DC converter. The converter according to embodiments of the invention is designed and implemented in Spice to explore the performance and limitations it may impose.

It is to be understood that this invention is not limited to the particular features of the means and/or the process steps of the methods described as such means and methods may vary.

To overcome the effect of partial shading on overall PV system efficiency, embodiments of the present invention provide a distributed power conversion system. The benefits of distributed power conversion over centralized power conversion in photovoltaic system are numerous. To enable a distributed power conversion a non-isolated high gain DC-DC boost converter circuit, according to embodiments of the invention, is provided. Moreover a DC-DC converter circuit according to embodiments of the invention may be suitable as a low power high frequency intra-module DC-DC converter. A converter according to embodiments of the invention is designed and implemented in Spice to explore the performance and limitations it may impose.

In general the solar cells and the modules can be either connected in series or in parallel in a PV system. A number of cells can be connected in a series string to increase the voltage level or in parallel to increase the current level or in a combination of the two to form a PV module. Several modules may also be connected in similar fashion to produce large PV power. Because of the partial shading different cells in a single PV module generate different power. There are power mismatches between these interconnected cells and also between interconnected modules due to their non-identical properties and the different operating conditions. Mismatch effects may occur either in the short-circuit current among series connected cells or in the open-circuit voltage among parallel connected cells. Because of the partial shading, cells are illuminated with different irradiance level and so each of them has different current-voltage characteristics. The current available in a series connection of solar cells is limited by the current of the solar cell that is less illuminated. When solar cells of a module are in series and module is partially shaded then the excess current produced by the most illuminated cells are in forward biased and causing the reverse bias of the least illuminated cells. This may result in power dissipation in the cells instead of power generation and consequently, will affect the overall efficiency. This effect is known as short-circuit current mismatch. Moreover, this current mismatch effect can also cause large power dissipation on the least illuminated cells which leads to a phenomenon called hot-spot heating and which may damage that cell permanently. In case of parallel connection among cells, open-circuit voltage mismatch leads to a lower total operating voltage and a significant power loss.

Figure 1:
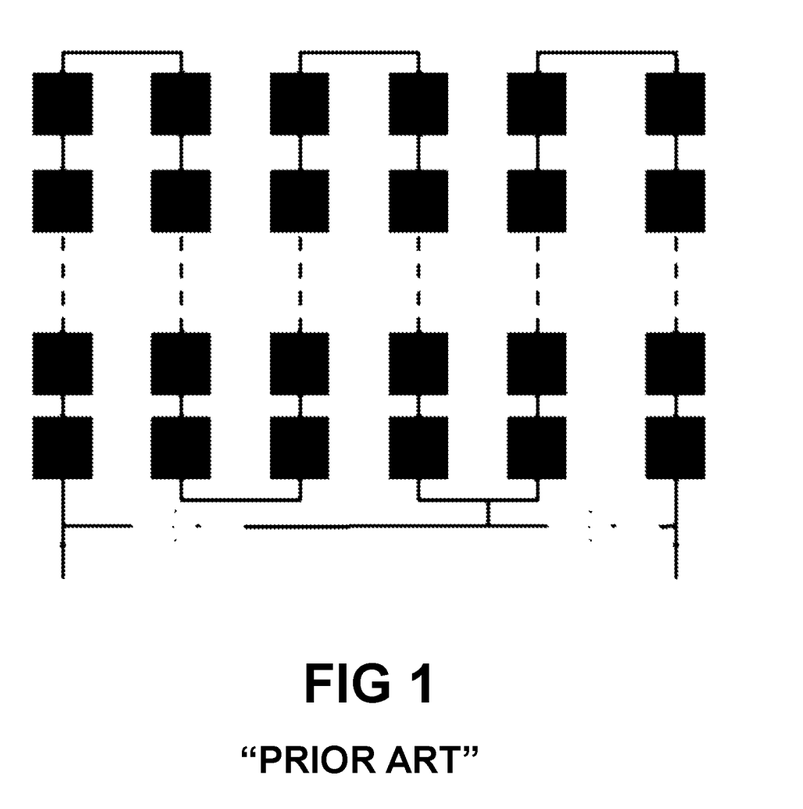
FIG. 1 illustrates two bypass diodes which are connected between strings in a PV module as known in the art.

In state of the art work, the most common topology of the interconnection between the solar modules and the power grid is by using a central inverter. Many solar cells are connected in series to form a PV module and these PV modules are connected in series or parallel in order to achieve high voltage (e.g. in the order of 200V to 400V DC) and multiple modules are connected to the input of a single DC-AC inverter through a single DC-DC converter. Traditionally bypass diodes are connected between the strings of the module to prevent from the mismatch effect as shown in FIG. 1. These diodes are connected in parallel, but with opposite polarity, between the string of solar cells. When partial shading occurs, if one cell is shaded the complete string is used to be bypassed by using bypass diode, although the other non-shaded cells in the string are perfectly able to deliver power. That way the generated power by the non-shaded cells is lost. It entails that even if a small area of the module is shaded, this may lead to a significant power drop. The efficiency of the PV system is decreased by using the central converter especially for low power application because the problem of partial shading and of the power mismatching on the module level becomes more eminent in case of low power application. As it is explained, the power level of strings of the module should be matched and operated under the same conditions because of the series connection of cells within the string. This limitation makes the central converter configuration unattractive. In order to limit the effects of mismatch effect, the approach of distributed power conversion is introduced, where more than one converter are used between several modules. In the literature, different topologies for distributed power conversion for PV system have been proposed. Some of the approaches are based on module level solution such as module integrated DC-DC converter that minimizes the impact of power mismatches by performing MPP tracking at module level. However, mismatches between strings inside the module cannot be mitigated by using module level DC-DC converter.

Figure 2A:
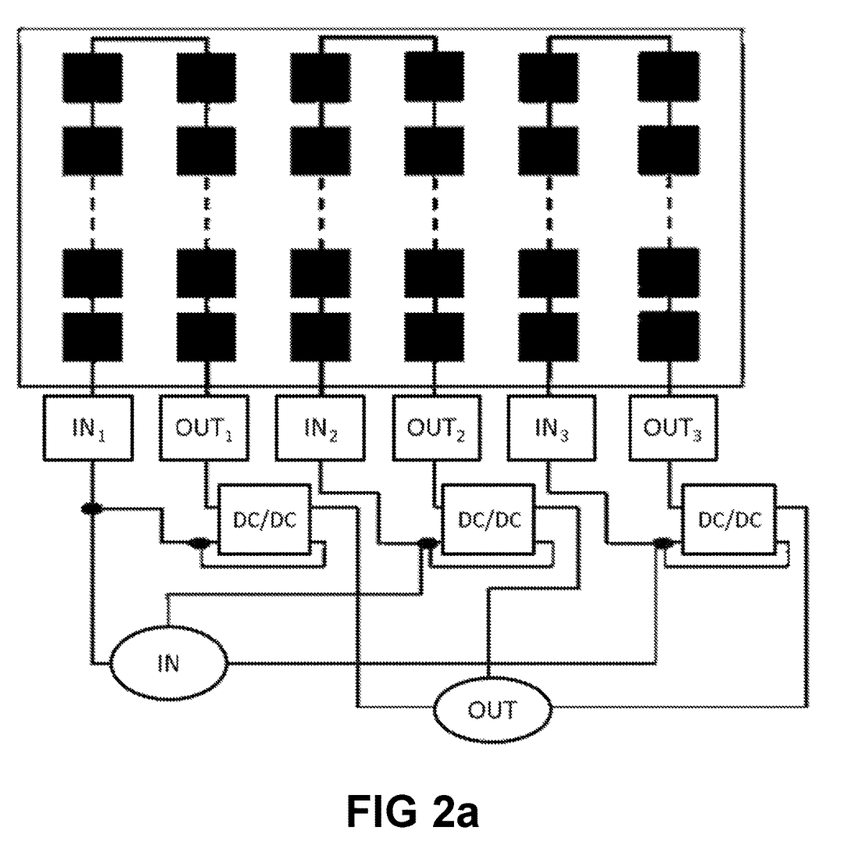
FIG. 2a illustrates a plurality of strings of solar cells, each string being connected in series with an intra-module converter, the plurality of intra-module converters being connected in parallel to each other according to embodiments of the present invention.
Figure 2B:
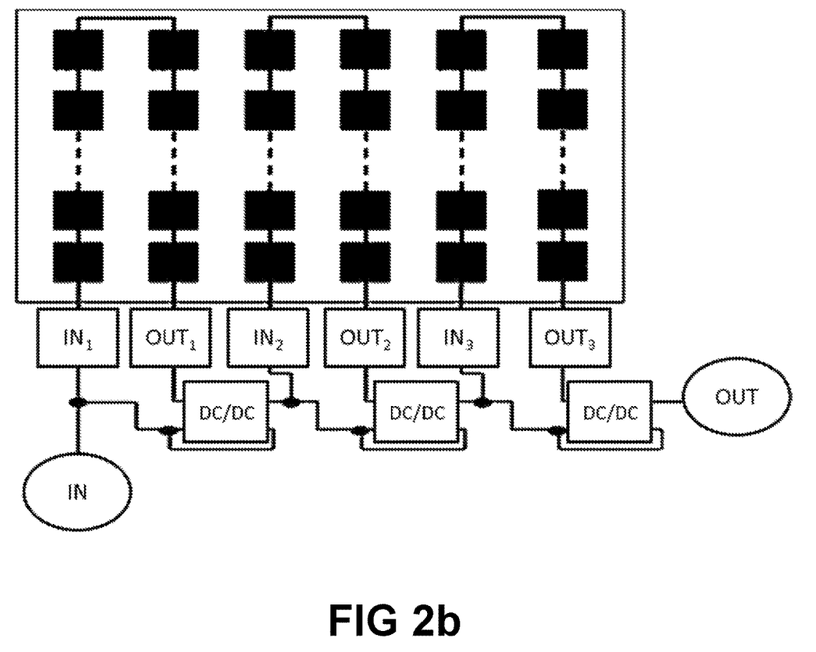
FIG. 2b illustrates strings of solar cells connected in series with an intra-module converter according to embodiments of the present invention.

Hence, advantageously embodiments of the invention provide implementation of an intra-module DC-DC converter at string level so that every string has its own MPP tracking. One of the approaches of using intra-module DC-DC converter in a PV module is depicted in FIGS. 2a and 2b. In FIG. 2a at least one intra-module DC-DC converter according to preferred embodiments of the invention is preferably connected in parallel to build up the power.

These intra-module DC/DC converters are preferably in operation dynamically based on illumination condition. When the entire module is fully illuminated and no mismatches are present within strings then one intra-module DC-DC converter is preferably operational for the whole module, whereby at that time all cells are preferably connected in series with the single converter, which can e.g. be achieved by means of switches (not shown), and whereby the remaining two intra-module DC-DC converters are preferably shut down. So, the reliability as a whole of the module will advantageously be increased because all the intra-module DC-DC converters will not be in operation all the time.

By using these converters, according to embodiments of the present invention, the overall efficiency of a PV system will advantageously be improved since the generated power by the partially shaded cells will also be added in total power instead of killing the whole string by using a bypass diode, as was done in the prior art. The number of intra-module DC-DC converters in a PV module and the connection of these DC-DC converters with each other and also with the string can also advantageously be varied depending on the requirement by the skilled person.

In alternative embodiments the intra-module DC-DC power converters may be connected in series (as shown in FIG. 2b) to build up the total power of the PV module. In these embodiments the duty cycle is preferably controlled accordingly, as a skilled person would do, and the output voltage of the individual DC-DC converters need not be fixed, in contrast to the embodiment shown in FIG. 2a where the DC-DC power converters are connected in parallel and thus need to have the same output voltage. However, the total output voltage of the PV panel shown in FIG. 2b preferably has a predefined constant value, so that multiple of these panels may be connected in series and/or in parallel to e.g. a DC-grid.

A parallel configuration of DC-DC power converters, e.g. as shown in the example of FIG. 2a, can be used when a constant output voltage is preferred. A series configuration of DC-DC power converters, e.g. as shown in the example of FIG. 2b, can be used when a constant output current is preferred.

In order to address low voltage output from some PV cells in shading conditions, an intra-module DC-DC converter according to embodiments of the present invention, advantageously may work with a minimum input voltage of around 10V. In preferred embodiments, the maximum input voltage of the converter is set to be around 30V since one intra-module DC-DC converter is preferably connected with several strings of a PV module when no mismatches are present within the strings. To this end, the PV module further comprises switches (not shown) configured for connecting the three strings in series, and for applying the total voltage over the three strings to said single intra-module DC-DC power converter. As a result, in preferred embodiments a wide input voltage range (from 10V to 30V) is preferably selected to operate the intra-module DC-DC converters according to embodiments of the invention dynamically, depending on the mismatches present. The total output voltage of the PV panel, is preferably high enough to connect with the second stage of voltage conversion for an interface with for example a DC-AC inverter. As a result, in preferred embodiments one selects a high voltage gain to achieve a high output voltage of the DC-DC converter. Since intra-module converter according to embodiments of the present invention are preferably and advantageously compact and small sized to implement at a string level, embodiments of the present invention provide a high frequency transformer-less converter. Preferably a non-isolated converter may be selected to make a smaller size and cost effective converter. Moreover, a higher frequency design according to embodiments of the invention advantageously allows for decreasing the magnitude of passive values and in turn the corresponding physical size of the passive components. As a result, embodiments of the invention advantageously provide a high switching frequency (e.g. in the range of 400 kHz to 500 kHz) which is useful for a compact and cost effective converter. Moreover, smaller values components advantageously reduce the energy storage in the circuit, allowing for an improved transient response. Since generated power from the string of the module is not high enough, embodiments of the present invention preferably provide a low power converter to interface the converters at string level inside the PV module. In preferred embodiment the ripple current is as low as possible because high ripple can causes MPPT fluctuation. Moreover, embodiments of the invention advantageously provide a high efficiency converter, which advantageously can help to improve the overall system efficiency.

For an intra-module DC-DC converter circuit according to embodiments of the present invention, a classical boost converter known in the art is not a good option, because this converter requires a very high duty cycle to achieve high gain and a very high duty cycle can increase the voltage stress across the power switches. Therefore, in preferred embodiments of the invention it is preferred to use a circuit or topology according to embodiments of the invention which advantageously do not need very high duty cycle. In literature, there are different kinds of circuits or topology which can be used as an intra-module converter: e.g. a boost-flyback converter integrated with high static gain, for these converters, voltage stress across the switches is lower than half of the output voltage which leads to lower conduction loss and apparently, high efficiency. However, it has a pulsating input current which can increase input ripple in the circuit.

Figure 3A:
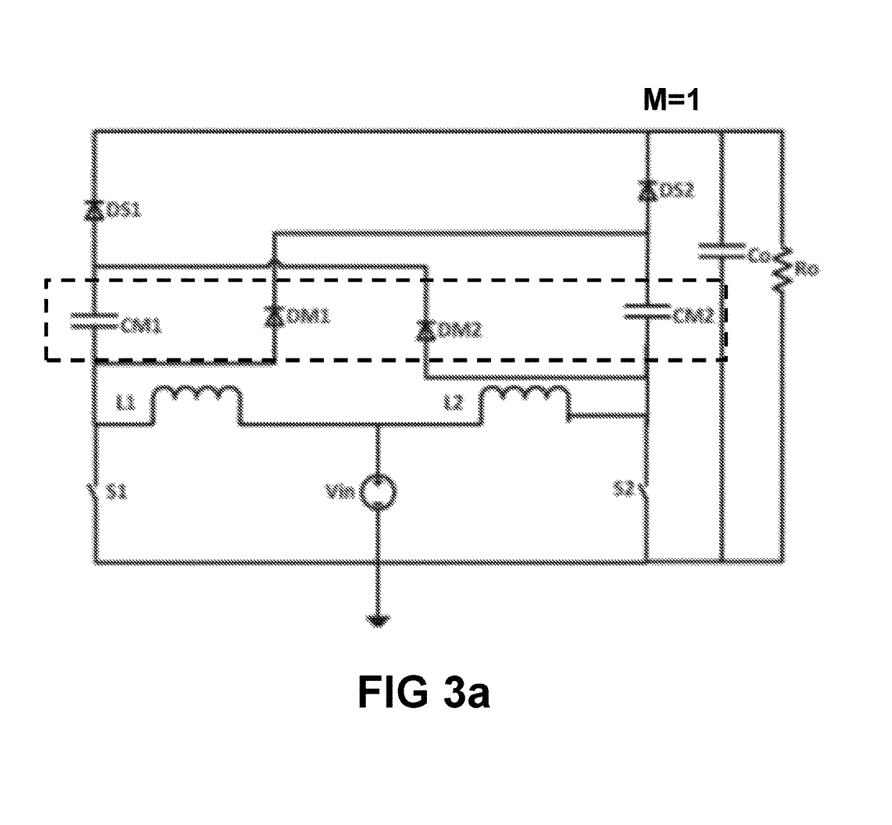
FIG. 3a illustrates a circuit for an intra-module converter according to embodiments of the present invention, whereby CM1 and CM2 together with DM1 and DM2 form a multiplier stage.
Figure 3B:
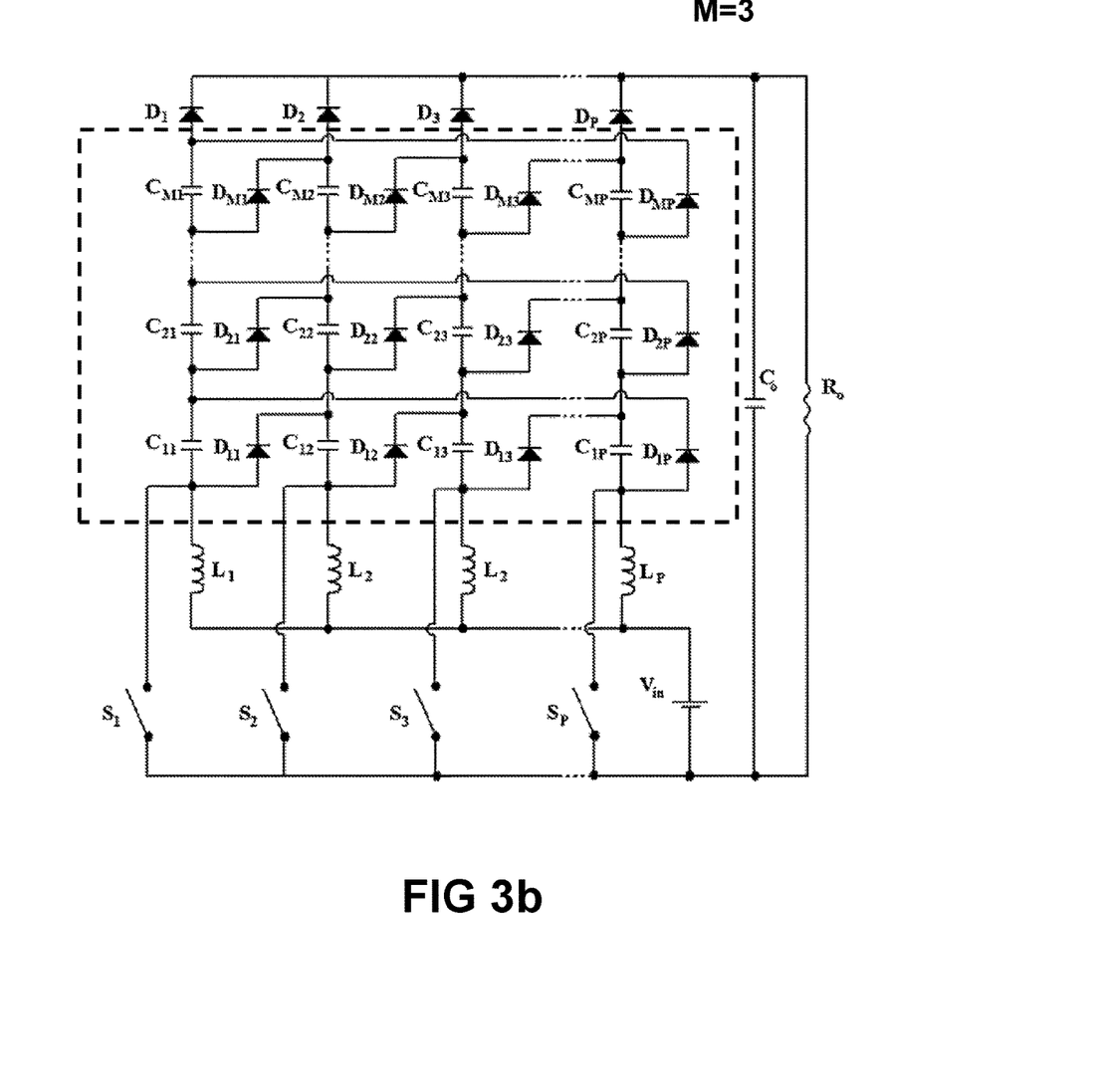
FIG. 3b illustrates a generic configuration of a multiphase intra-module converter according to embodiments of the present invention, whereby three multiplier stages are illustrated.

In embodiments of the present invention, a non-isolated interleaved boost topology has been provided to advantageously design a low power, high gain (e.g. factor of about 12), high frequency (e.g. about 400 to 500 kHz) DC-DC converter for intra-module power conversion. The schematic diagram of the circuit or topology is shown in FIGS. 3a and 3b. Although these circuit topologies per se are known in the art, they are shortly described here. In an interleaved boost topology according to embodiments of the invention, preferably multiplier capacitors are connected in series and integrated in a boost converter with the possibility to increase several stages to achieve high gain as illustrated in FIG. 3b which illustrates a circuit with three stages (M=3). By for instance expanding the number of the series and parallel stages of a circuit according to embodiments of the invention which is presented in FIG. 3a, a generic configuration of a multiphase boost voltage multiplier is obtained, as shown in FIG. 3b. The number of parallel stages is represented by the parameter "P" and the number of multiplier stages is represented by the parameter "M", which is defined by the number of the multiplier capacitors in series with each switch. The minimum preferred configuration of the multiphase structure, according to embodiments of the invention, is composed by two parallel stages and one series multiplier stage, as shown in 3a. This configuration of the multiphase boost voltage multiplier is composed by the capacitors and diodes. The multiplier capacitors are charged by the diodes and, with a voltage equal to the output voltage of the classical boost, and this is the maximum voltage applied to the power switches. The multiphase configuration can moreover advantageously reduce significantly the input current ripple and the output voltage ripple due to the operation of the parallel stages with different phases. The main operation characteristics, as the high static gain and low switch voltage, presented by the single-phase structure can advantageously also be maintained for the multiphase topology. The analysis in this application which is presented for the minimum configuration (see FIG. 3a) can be extended for the generalized structure, considering its modularity. In preferred embodiments two multiplier capacitors are connected with two multiplier diodes to form a multiplier stage (M=1). In FIG. 3a, two multiplier capacitors (CM) with two multiplier diodes (DM) are preferably connected to form a first stage of multiplier circuit and here multiplier stage (M) is one. The diodes DS1 and DS2 in FIGS. 3a and 3b are the output diodes. These multiplier diodes advantageously help to charge the multiplier capacitors with a voltage ($V_M$) which is actually the output voltage of the classical boost converter. The output voltage of the circuit is equal to the (M+1) times the voltage $V_M$ for this topology. Therefore, the voltage gain of this circuit according to embodiments of the invention is a function of the multiplier stage (M) and in that way, by increasing the multiplier stage, a high voltage gain is possible to achieve without high voltage stress. Moreover, since two power switches are connected in parallel in preferred embodiments of the invention, it is possible to achieve high voltage gain without having high voltage stress, resulting in lower conduction loss, which in turn helps to increase efficiency. In preferred embodiments, the current may be divided among the various multiplier diodes, as in parallel connection and this also helps to reduce conduction losses of the diodes. In addition, it is advantageously possible to enable and implement the interleaved technique because of the configuration of the switches. Due to the interleaved technique according to embodiments of the invention, a low input current ripple and low output voltage ripple can advantageously be achieved. This technique, according to embodiments of the invention, also helps to reduce current stress in all components. Ripple of the circuit according to embodiments of the invention also will be minimized because of a preferred high switching frequency of the circuit. To make a compact converter, as is preferred in embodiments of the invention, a switching frequency of 500 kHz is preferably kept. The converter according to embodiments of the invention is preferably operated in varying duty ratio because of the wide input voltage range (e.g. 10V to 30V) of the converter and to get fixed output voltage, e.g. a voltage of about 120V. This circuit or topology according to embodiments of the invention is suitable to operate in higher and lower than 0.5 duty ratio. As low power converter is preferably provided to interface at string level, the designed converter according to embodiments of the invention, is preferably rated lower than 300 W. The multiple usages of diodes, according to embodiments of the invention, may introduce power loss because of their reverse recovery current, which can be overcome preferably by using low loss diode such as for instance a SiC diode or by for instance adding at least an extra circuit such as for instance snubber circuit. Table I shows preferred design specifications for an intra-module converter according to embodiments of the invention.

TABLE I

Preferred design specifications for an intra-module converter according to embodiments of the invention.

| Design Specifications | Values |
| --- | --- |
| Input voltage range (V) | 10-30 |
| Power range (W) | 80-240 |
| Max. input current (A) | 8 |
| Operating frequency(kHz) | 500 |
| Output voltage (V) | 120 |
| Max. voltage gain | 12 |
| Avg. Efficiency (Min.) | 95% |

An intra-module converter topology according to embodiments of the invention has been designed and implemented in e.g. Spice as validation such to explore the suitability of this topology as intra-module converter. Real commercial model of MOSFETs and diodes have been used for all these simulation. In this application, the converter operation is in continuous conduction mode with M=2. The static gain ($A_v$) of the converter is shown in Equation 1 below, where M is known as number of multiplier stage and D is duty ratio of the converter. By applying 0.75 duty ratio, it is possible to achieve high voltage gain of 8 with first stage of multiplier (M=1) and also higher voltage gain of 12 with second stage of multiplier (M=2).

$$A_v = \frac{M+1}{1-D} \qquad \text{(Eq. 1)}$$

Figure 4:
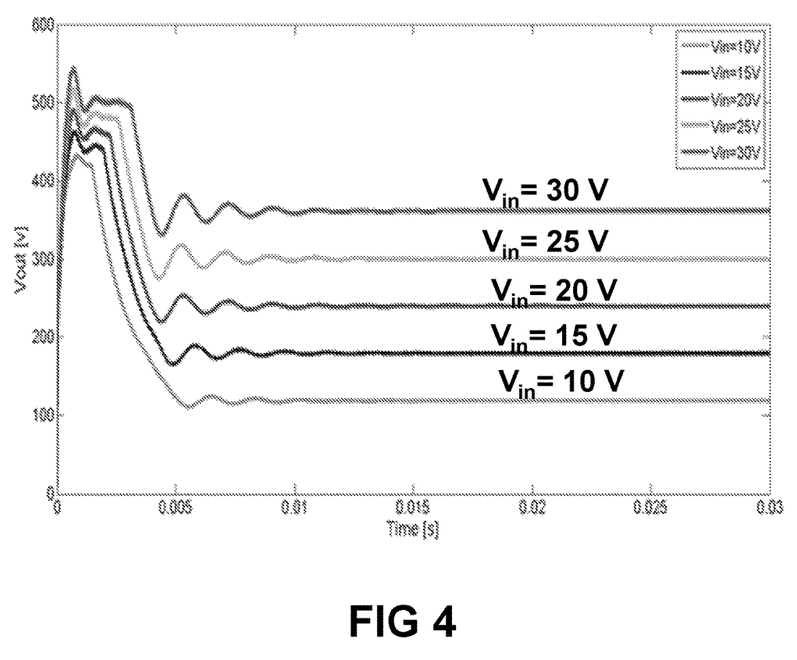
FIG. 4 illustrates the output voltage of a converter according to embodiments of the present invention with a varying input voltage from 10V to 30V with a 5V step.

FIG. 4 presents the converter operational waveform (simulated) when M=2 and D=0.75 and shows that this topology can be used to achieve gain of a factor 12. It is also shown that the converter is able to response with wide input voltage range of 10V to 30V. Here the input voltage is simulated with minimum of 10V to maximum of 30V with 5V step. The designed converter is simulated with switching frequency of 500 kHz when M=2 and D=0.75.

Figure 5:
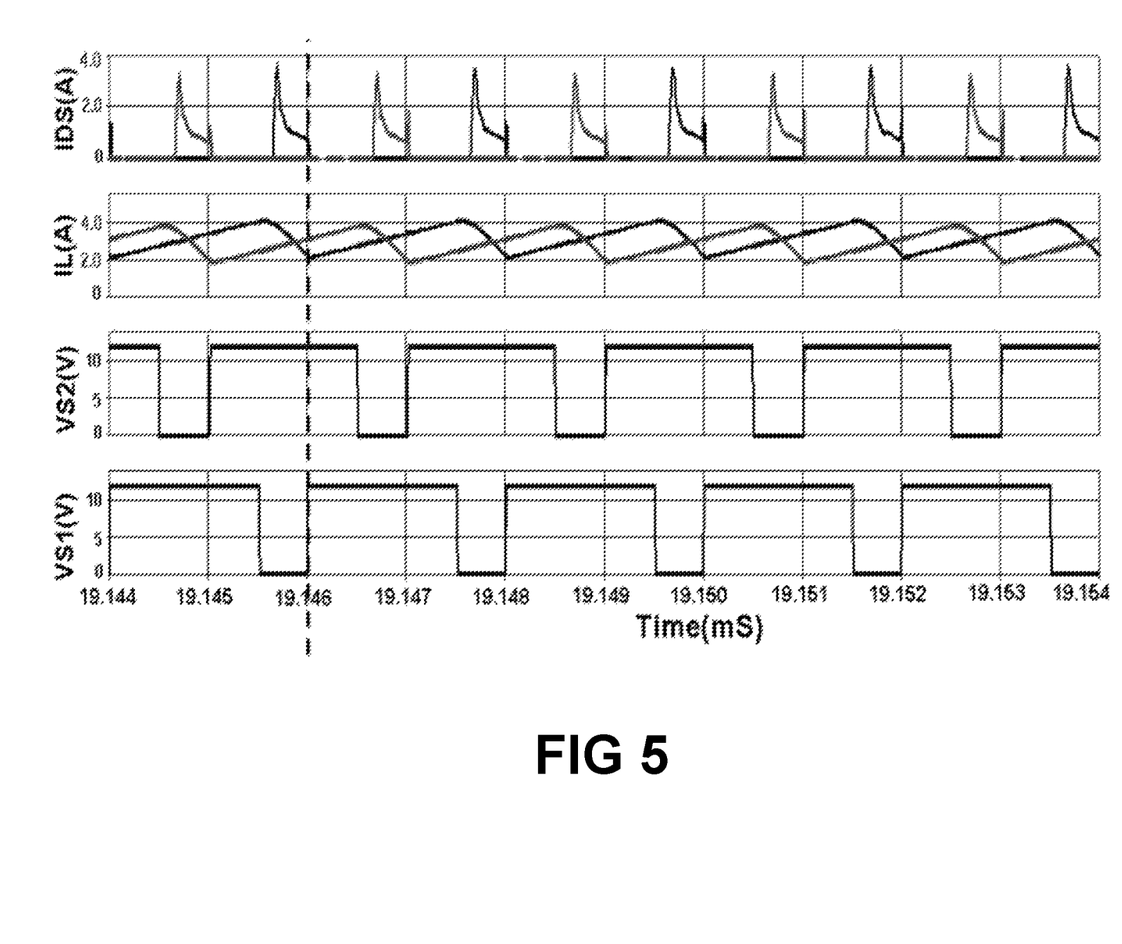
FIG. 5 illustrates a current waveform of an inductor current and output diodes current of the converter according to embodiments at 500 kHz frequency, whereby the black dotted line indicates one switching cycle.
Figure 6:
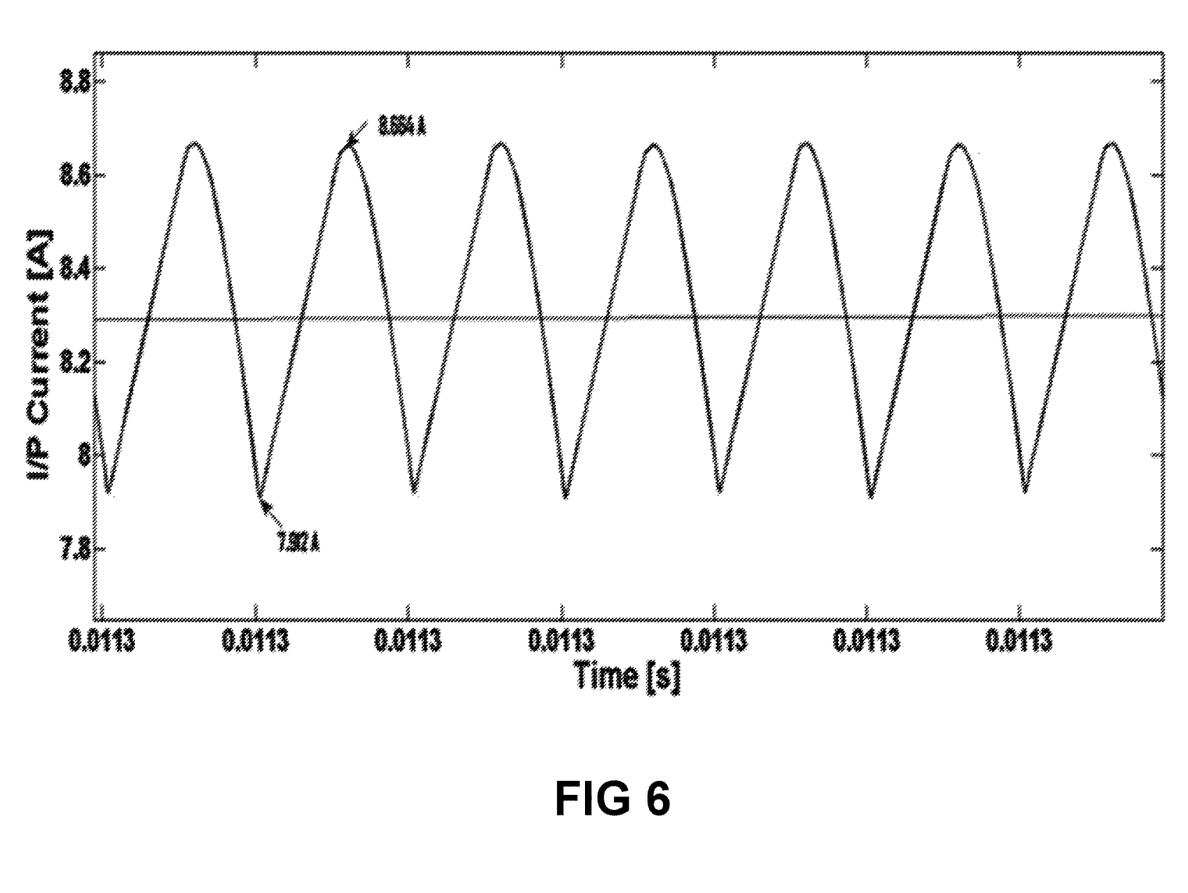
FIG. 6 illustrates an input ripple current of the converter according to embodiments of the present invention at a switching frequency of 500 kHz.

Current waveform of this simulation is depicted in FIG. 5 and it is also shown the interleaved operation of the two inductor's current. The input current is considered as 8 A. The switching signal for the two MOSFETs (VS1, VS2), current of two inductors (I(L1), I(L2)) and current of two output diodes (I(DS1), I(DS2)) are shown here. According to the theoretical waveform, the simulated current waveforms of the converter give an expected result of the topology, working at 500 kHz. This demonstrates the viability of the selected topology at high frequency operation. The input ripple current is already quite low in higher switching frequency at 500 kHz and also due to the implied interleaved technique. In this case, ripple current is approximately 9.1%, which is shown in FIG. 6.

In Summary, the present invention relates to an intra-module DC-DC power converter and a Photovoltaic (PV) module comprising same. The switching frequency of said intra-module DC-DC power converters may be 500 kHz. The PV module may have a controller and a plurality of switches for allowing each individual string of said PV module to be connected to one corresponding DC-DC converter, or for allowing two or more strings of said module to be connected in series and to apply the voltage of the combined string to a single DC-DC converter. The input voltage range of the DC-DC converters may be 10V to 30V, and the output voltage range may be 120V to 360V. The DC-DC converters may be connected in series or in parallell.

Multiple such PV panels may be connected in a DC-grid.

[83] It is also to be understood that the terminology used herein is for purposes of describing particular embodiments only, and is not intended to be limiting. It must be noted that, as used in the specification and the appended claims, the singular forms "a" "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values.

The invention claimed is:

1. A photovoltaic module comprising:
   at least two strings, each string including a plurality of solar cells connected in series;
   a circuit for obtaining power from a photovoltaic unit, the circuit comprising at least two intra-module DC-DC power converters connected with a string and in parallel between each other;
   wherein said intra-module DC-DC power converters comprise:
   at least one multiplier stage (M), said multiplier stage comprising two capacitors ($C_{M1}$, $C_{M2}$), each capacitor respectively connected to a diode ($D_{M1}$, $D_{M2}$), and wherein said diodes ($D_{M1}$, $D_{M2}$) of the at least one multiplier cell are adapted to charge the multiplier capacitors ($C_{M1}$, $C_{M2}$) with a charge voltage ($V_M$), and wherein an input signal ($V_{in}$) from the photovoltaic unit is converted into an output signal ($V_{out}$), wherein said output signal is (M+1) times the charge voltage ($V_M$).

2. The photovoltaic module of claim 1, wherein the two capacitors ($C_{M1}$, $C_{M2}$), are respectively connected in series by one diode ($D_{M1}$, $D_{M2}$) and both the capacitors and diodes are connected in parallel with an output capacitor ($C_0$).

3. The photovoltaic module of claim 1, wherein each capacitor ($C_{M1}$, $C_{M2}$) is connected in series to at least one switch, resulting in two switches ($S_1$, $S_2$) and wherein said switches are connected in parallel.

4. The photovoltaic module of claim 3, wherein the switching frequency of said switches is 400 to 500 kHz or the switching frequency is fixed.

5. The photovoltaic module of claim 1, wherein the circuit further comprises two inductors ($L_1$, $L_2$).

6. The photovoltaic module of claim 1, wherein the intra-module DC-DC power converter is a non-isolated power converter or wherein the intra-module DC-DC power converter is a boost power converter.

7. The photovoltaic module of claim 1, wherein the input signal of the intra-module DC-DC power converter is an input voltage ($V_{in}$) that ranges from at least 10 to 30V or wherein the input signal of the intra-module DC-DC power converter is an input current of at most 8 A.

8. The photovoltaic module of claim 1, wherein the output signal of the intra-module DC-DC power converter is a voltage ($V_{out}$) of at least 120V.

9. The photovoltaic module of claim 1, wherein the maximal voltage gain of the intra-module DC-DC power converter, of a circuit comprising two multiplier stages (M=2), is 12.

10. The photovoltaic module according to claim 1, wherein the switching frequency lies in the range of 400 to 500 kHz, and the output voltage lies in the range of 120 to 360 V;
   wherein the circuit comprises an intra-module DC-DC power converter, wherein said intra-module DC-DC power converter comprises:
   at least one multiplier stage (M), said multiplier stage comprising two capacitors ($C_{M1}$, $C_{M2}$), each capacitor respectively connected to a diode ($D_{M1}$, $D_{M2}$), and wherein said diodes ($D_{M1}$, $D_{M2}$) of the at least one multiplier cell are adapted to charge the multiplier capacitors ($C_{M1}$, $C_{M2}$) with a charge voltage ($V_M$);
   wherein an input signal ($V_{in}$) from the photovoltaic unit is converted into an output signal ($V_{out}$), wherein said output signal is (M+1) times the charge voltage ($V_M$);
   wherein the module comprises a first circuit comprising a first intra-module DC-DC power converter coupled or connected to a first photovoltaic unit, the first circuit comprises an intra-module DC-DC power converter, wherein said intra-module DC-DC power converter comprises: at least one multiplier stage (M), said multiplier stage comprising two capacitors ($C_{M1}$, $C_{M2}$), each capacitor respectively connected to a diode ($D_{M1}$, $D_{M2}$), and wherein said diodes ($D_{M1}$, $D_{M2}$) of the at least one multiplier cell are adapted to charge the multiplier capacitors ($C_{M1}$, $C_{M2}$) with a charge voltage ($V_M$), and wherein an input signal ($V_{in}$) from the photovoltaic unit is converted into an output signal ($V_{out}$), wherein said output signal is (M+1) times the charge voltage ($V_M$);
   a second circuit comprising a second intra-module DC-DC power converter coupled or connected in series or parallel with the first intra-module DC-DC power converter and coupled or connected to a second photovoltaic unit;
   a controller that is adapted to control a voltage of the first and second intra-module DC-DC power converters.

11. The photovoltaic module according to claim 1, further comprising a plurality of strings, each string being connectable to at least one corresponding DC-DC power converter, wherein the DC-DC power converters of all the strings are connected in parallel, and are adapted for generating a same output voltage (Vout) or wherein the DC-DC power converters of all the strings are connected in series.

12. The photovoltaic module according to claim 1, further comprising a plurality of switches for allowing the strings to be connected in series, and to allow the series connection to be connected to one of said DC-DC power converters.

13. A DC power grid comprising at least two photovoltaic modules according to claim 1.

14. Use of a photovoltaic module according to claim 1 for obtaining power from a photovoltaic unit or to enable a distributed power management system.

15. A system for controlling a plurality of photovoltaic units, the system comprising:
   a first photovoltaic module comprising:
   at least two strings, each string including a plurality of solar cells connected in series,
   a first circuit comprising a first intra-module DC-DC power converter coupled or connected to a first photovoltaic unit, the first circuit comprises at least two intra-module DC-DC power converters connected with a string and in parallel between each other, wherein said intra-module DC-DC power converters comprise: at least one multiplier stage (M), said multiplier stage comprising two capacitors ($C_{M1}$, $C_{M2}$), each capacitor respectively connected to a diode ($D_{M1}$, $D_{M2}$), and wherein said diodes ($D_{M1}$, $D_{M2}$) of the at least one multiplier cell are adapted to charge the multiplier capacitors ($C_{M1}$, $C_{M2}$) with a charge voltage ($V_M$), and wherein an input signal ($V_{in}$) from the photovoltaic unit is converted into an output signal ($V_{out}$), wherein said output signal is (M+1) times the charge voltage ($V_M$);

a second photovoltaic module comprising:

at least two strings, each string including a plurality of solar cells connected in series, a second circuit comprising a second intra-module DC-DC power converter coupled or connected in series or parallel with the first intra-module DC-DC power converter and coupled or connected to a second photovoltaic unit;

a controller that is adapted to control a voltage of the first and second intra-module DC-DC power converters.

16. The system according to claim 15, further comprising at least a third intra-module DC-DC power converter, wherein said at least third intra-module DC-DC power converter is coupled or connected in series or parallel to said first and/or second DC-DC power converter.

17. The system of claim 15, further comprising converting means to connect or couple an output of said DC-DC power converters to a public grid through a next stage of power conversion.

* * * * *